United States Patent [19]

Kim et al.

[11] 4,394,488
[45] Jul. 19, 1983

[54] ZINC PEROXIDE PROCESS

[75] Inventors: Chan J. Kim; Ahti A. Koski, both of Sarnia, Canada

[73] Assignee: Polysar Limited, Ontario, Canada

[21] Appl. No.: 400,008

[22] Filed: Jul. 20, 1982

[30] Foreign Application Priority Data

Aug. 10, 1981 [CA] Canada ................................ 383563

[51] Int. Cl.$^3$ .......................... C08J 3/24; C08C 19/04; C08F 236/12; C08C 19/42
[52] U.S. Cl. .................................... 524/432; 523/334; 524/556; 524/566; 525/373; 525/387
[58] Field of Search ............... 525/373, 387, 329, 336; 524/432, 566, 556; 523/334

[56] References Cited

U.S. PATENT DOCUMENTS

| | | | |
|---|---|---|---|
| 2,563,442 | 8/1951 | Wood et al. | 23/147 |
| 2,681,327 | 6/1954 | Brown | 525/373 |
| 2,724,707 | 11/1955 | Brown | 525/373 |
| 3,403,136 | 9/1968 | Baker | 525/373 |
| 4,332,918 | 6/1982 | Fukahori et al. | 525/373 |

FOREIGN PATENT DOCUMENTS 936643 11/1973 Canada.

OTHER PUBLICATIONS

Derwent Abst. 44628B/24 (4–1979) JS4054176 Otsuka Kagaku "Resin Foaming Agent-Contg. Zinc Peroxide...".
Derwent Abst. 73789C/42 (9–1980) DT2914058 Otsuka Kagaku "Foaming High Melting Synthetic Resin-with Chem. Stable Zinc Peroxide".
Polysar Limited dated 2/75 entitled "KRYNAC PA50 and POLYSAR XPRD C423-Curative Masterbatches for Carboxylated NBR".

Primary Examiner—John C. Bleutge
Assistant Examiner—Herbert J. Lilling
Attorney, Agent, or Firm—Stevens, Davis, Miller & Mosher

[57] ABSTRACT

A process is provided for the production of a mixture of butadiene-acrylonitrile polymer and zinc peroxide which comprises (i) reacting an agitated aqueous mixture of French Process zinc oxide, sulphuric acid and hydrogen peroxide to form an aqueous slurry of a mixture of zinc peroxide and zinc oxide, and (ii) mixing with said slurry a latex of a butadiene-acrylonitrile polymer, followed by coagulating the mixture and recovering and drying the product.

9 Claims, No Drawings

ZINC PEROXIDE PROCESS

FIELD OF THE INVENTION

This invention is directed to a process for the production of a mixture of butadiene-acrylonitrile polymer and zinc peroxide.

DESCRIPTION OF THE PRIOR ART

It is known that many synthetic polymers may be vulcanized by heating in the presence of various peroxidic compounds. Of the synthetic polymers containing various polar groups, many can be vulcanized by heating in the presence of generally basic inorganic compounds. The carboxylated nitrile polymers, i.e. butadiene-acrylonitrile polymers containing copolymerized carboxylic groups, may be vulcanized by heating in the presence of zinc oxide and the scorch problems commonly encountered in such a vulcanization system may be largely overcome by using zinc peroxide instead of zinc oxide. For use in the vulcanization of carboxylated nitrile polymers, the zinc peroxide is preferably used as a masterbatch with a nitrile polymer (i.e. a butadiene-acrylonitrile polymer). Such a masterbatch is preferably prepared by mixing an aqueous suspension of zinc peroxide with a latex of a nitrile polymer and coagulating the mixture. The masterbatch preferably contains at least 27.5 percent of zinc peroxide by dry weight. The masterbatch may be used as a curative masterbatch and is usually used in combination with conventional sulphur curative systems for the vulcanization of carboxylated nitrile polymers.

SUMMARY OF THE INVENTION

The present invention provides a process for the production of a mixture of a butadiene-acrylonitrile polymer and zinc peroxide which comprises: (I) forming an aqueous mixture in a reactor equipped with means for agitation and means for temperature control, said aqueous mixture comprising (a) from about 15 to about 30 weight percent of zinc oxide made by the French Process being at least about 99 weight percent pure and having an average particle size of from about 0.1 to about 0.5 micron, (b) from about 0.0075 to about 0.2 parts by weight of sulphuric acid per part by weight of zinc oxide, (c) from about 1 to about 5 moles of hydrogen peroxide per mole of zinc oxide, and (d) the balance to 100 weight percent being water, said aqueous mixture being formed by adding said zinc oxide to a preformed mixture in said reactor of said sulphuric acid, said hydrogen peroxide and said water while maintaining the contents of said reactor in an agitated condition and at a temperature of from about 20° to about 35° C. throughout the addition of said zinc oxide and then for a further time of from about 1 to about 4 hours, thereby producing an aqueous slurry of a mixture of zinc peroxide and zinc oxide containing less than about 0.05 weight percent of residual hydrogen peroxide; and (II) transferring said aqueous slurry to a mixing vessel, adding thereto and mixing therewith a stream of an aqueous latex of a butadiene-acrylonitrile polymer, said polymer containing from about 20 to about 45 weight percent acrylonitrile and having a molecular weight characterized by a Mooney (ML 1+4 at 100° C.) of from about 35 to about 65, contacting the resulting mixture with an aqueous stream of calcium chloride to coagulate said mixture, separating said coagulated product from the aqueous phase, recovering and drying said product to a water content of less than about 1 weight percent to yield a final product containing from about 48 to about 57 weight percent of said polymer and from about 43 to about 52 weight percent of said mixture of zinc peroxide and zinc oxide wherein said final product contains at least about 27.5 weight percent zinc peroxide.

DETAILED DESCRIPTION

The zinc oxide used in the present process is high purity material, being at least about 99 weight percent zinc oxide, usually at least about 99.5 weight percent zinc oxide and most preferably at least about 99.9 weight percent zinc oxide. Impurities such as lead and sulphur normally form less than about 0.1 weight percent of the zinc oxide. High purity zinc oxide may be produced by either the American Process or the French Process. In the American Process, also known as the Direct Process, the initially-formed zinc vapour is immediately oxidized without ever being condensed while in the French Process, also known as the Indirect Process, the initially-formed zinc vapour is first condensed and then revapourized and oxidized. In the process of the present invention not all of the zinc oxide is converted to zinc peroxide and in the present process it has been found that only the use of zinc oxide made by the French Process leads to the required yield of the peroxide.

The hydrogen peroxide that is used in the process of the present invention may be of any suitable concentration. Preferably the hydrogen peroxide is about 35 to about 50 weight percent in water. The quantity of hydrogen peroxide to be used in the present process is from about 1 to about 5, preferably from about 1 to about 2, moles of hydrogen peroxide per mole of zinc oxide. The sulphuric acid which is used may also be of any suitable concentration and preferably is concentrated sulphuric acid, that is, about 98 weight percent. The quantity of sulphuric acid used in the present process is from about 0.0075 to about 0.2, preferably from about 0.008 to about 0.014, parts by weight per 1 part by weight of zinc oxide. Preferably, the amount of zinc oxide used is such as to provide from about 15 to about 30, preferably from about 20 to about 25, weight percent slurry in the aqueous mixture. The temperature at which the zinc oxide is reacted with the hydrogen peroxide is from about 20° to about 35° C., preferably from about 25° to about 30° C., which is readily maintained by undertaking the reaction in a temperature-controlled reactor. Such a reactor is equipped with an agitator to provide adequate mixing of the contents, and the reactor preferably is equipped with internal baffles to ensure good mixing of the contents.

A preferred order of operating the present process is to add the required quantity of pure water to the reactor and allow the water to reach thermal equilibrium at the desired temperature. Hydrogen peroxide and sulphuric acid are then added and again thermal equilibrium is established. Zinc oxide powder is slowly added such that all of the zinc oxide has been added over a period of time such as thirty minutes. Although the reaction is essentially complete within about one hour after the final addition of the zinc oxide, the reaction mixture is retained in the reactor for a further one to three hours to decompose any excess hydrogen peroxide, preferably such that the residual hydrogen peroxide is less than about 0.05 weight percent of hydrogen peroxide in the mixture. The reaction produces an aqueous slurry of a mixture of zinc peroxide and zinc oxide.

In the present process, it has been found that the process used to make the zinc oxide affects the amount of zinc oxide that can be converted to zinc peroxide and the rate at which the conversion occurs. Because zinc oxide is a solid material, it is not possible to achieve 100 percent conversion to zinc peroxide. Thus, the reaction mixture from the reactor is an aqueous slurry of a mixture of zinc oxide and zinc peroxide. It has been discovered that under the reaction conditions defined for the present process, zinc oxide made by the French Process must be used to achieve the required conversion of the zinc oxide to zinc peroxide. French Process zinc oxide is available commercially with average particle sizes of from about 0.1 to about 0.5 micron, and with apparent densities of from about 0.27 to about 0.30 g per cm$^3$. It has also been found that if the reaction temperature is allowed to rise above about 35° C., the mixture of zinc peroxide and zinc oxide formed has an off-white-to-yellow color, which is undesirable.

The aqueous slurry from the reactor, when the residual hydrogen peroxide content is preferably less than about 0.05 weight percent, is transferred to a mixing vessel and a stream of latex of a butadiene-acrylonitrile polymer is also added to the mixing vessel. The butadiene-acrylonitrile polymer may contain from about 20 to about 45, preferably from about 30 to about 40, weight percent of acrylonitrile and is prepared by the well known emulsion free radical polymerization of butadiene and acrylonitrile, and the molecular weight of the polymer may be a Mooney of from about 35 to about 65, preferably from about 40 to about 55 (Mooney being ML 1+4 at 100° C.). The latex may contain from about 20 to about 40 weight percent of polymer and may optionally be further diluted with water. The ratio of the zinc oxide-zinc peroxide slurry to latex will be such as to provide a final weight ratio of zinc oxide-zinc peroxide to polymer of from about 43:57 to about 52:48, preferably from about 45:55 to about 50:50. After adequate mixing of the zinc oxide-zinc peroxide mixture and the polymer latex, the resulting mixture is contacted with an aqueous stream of calcium chloride either in the aforesaid mixing vessel or in a separate coagulation vessel. The aqueous stream of calcium chloride may contain from about 2 to about 25 weight percent of calcium chloride. The coagulated product so formed is separated from the aqueous phase, optionally water washed and dried, such as in a hot air, drier, to yield a final product having a water content of less than about 1, preferably less than about 0.5, weight percent and containing from about 48 to about 57, preferably from about 50 to about 55, weight percent of butadiene-acrylonitrile polymer and from about 43 to about 52, preferably from about 45 to about 50, weight percent of the zinc oxide-zinc peroxide mixture. Preferably, the amount of zinc peroxide in the final product is at least about 27.5 weight percent and most preferably from about 31 to about 33 weight percent.

The following examples are intended to illustrate the process of the present invention and do not limit the scope thereof.

EXAMPLE 1

For this Example, the zinc oxide used was made by the French Process, had an average particle diameter of about 0.17 micron and a purity of at least 99.9 weight percent.

To a 2 liter container equipped with an agitator and cooling coils for temperature control were added 400 ml of distilled water, 100 g of 50 weight percent hydrogen peroxide and 2 g of concentrated sulphuric acid (i.e. about 98% concentration) and the agitator was turned on. Coolant was circulated to the cooling coils to control the temperature to about 25° C. 100 g of zinc oxide were added in six increments of approximately equal weight at intervals of five minutes and the temperature was controlled such that it rose no higher than 30° C. The mixture was agitated for a total time of 80 minutes. A small sample of the mixture was removed and analysis showed that the sample contained 74 weight percent of zinc peroxide. 275 g of the mixture and 219 g of a nitrile polymer latex were added to a container and mixed at room temperature to yield a nitrile polymer latex-zinc oxide/zinc peroxide mixture. The nitrile polymer latex contained about 30.7 weight percent polymer and the polymer was a butadiene-acrylonitrile polymer containing about 34 weight percent of acrylonitrile and having a Mooney (ML 1+4 at 100° C.) of about 35.

To a 5 liter container equipped with an agitator there were added about 1.3 liters of water at a temperature of about 95° C. The nitrile polymer latex-zinc oxide/zinc peroxide mixture was added to the water in the container and the agitator turned on to provide intense agitation. 67 ml of a 25 percent solution of calcium chloride in water were added to cause coagulation of the mixture and the mixing was continued for a further ten minutes. The solid product was recovered and dried. Analysis showed that it contained 55 weight percent of the nitrile polymer and 45 weight percent of the zinc oxide/zinc peroxide mixture. Based on the 74 weight percent content of zinc peroxide in the zinc oxide/zinc peroxide mixture, the amount of zinc peroxide in the solid was calculated to be 33 weight percent. The solid mixture appeared to be a homogeneous mixture.

EXAMPLE 2 (Comparative)

Following the procedure described in Example 1, 100 g of the same zinc oxide were reacted with 80 g of 50 weight percent hydrogen peroxide in 150 ml of distilled water. No sulphuric acid was used and the reaction temperature was allowed to rise to about 50° to 55° C. over the reaction time of 95 minutes. The resulting zinc oxide/zinc peroxide was yellow in color and contained only about 47 weight percent of zinc peroxide.

EXAMPLE 3 (Comparative)

A sample of zinc oxide made by the American Process and having an average particle size of about 0.5 micron was used.

To a 2 liter container equipped with an agitator and a cooling coil there were added 400 ml of water, 160 g of 50 weight percent hydrogen peroxide and 1 g of concentrated sulphuric acid. The agitator was turned on and coolant circulated to the cooling coils to control the temperature to 28° C. 100 g of zinc oxide were added in a single addition and the mixture was agitated for a total time of 80 minutes. Analysis of a sample of the zinc oxide/zinc peroxide product showed that it contained about 34 weight percent of zinc peroxide.

EXAMPLE 4

For this example, four samples of zinc oxide of differing particle size were used. Two samples made by the French Process and two samples made by the American Process (comparative) were used as listed in the following Table I. The following procedure was used for each sample.

To a 2 liter container equipped with an agitator and cooling coils there were added 125 ml of water, 100 g of 50 weight percent hydrogen peroxide and 0.4 g of concentrated sulphuric acid. The agitator was turned on and coolant circulated to the cooling coils to control the temperature to between 25° and 30° C. 50 g of zinc oxide were added in five approximately equal increments at intervals of five minutes. The mixture was agitated for a total time of 2 hours yielding as the initial product an aqueous slurry of a mixture of zinc peroxide and zinc oxide. A small sample was then removed for analysis of the zinc peroxide content. 240 g of the mixture containing 20 weight percent solids and 188 g of a nitrile polymer latex were added to a container equipped with an agitator and mixed at room temperature. The nitrile polymer latex contained about 31.2 weight percent polymer and the polymer was as described in Example 1. To this mixture was added 1 liter of water at a temperature of about 95° C. with continued agitation. 60 ml of a 25 percent solution of calcium chloride in water were added slowly over a period of about 5 minutes to cause coagulation and mixing was continued for a further 10 minutes. The solid product was recovered and dried and this final product was analysed for zinc peroxide content. Analytical results are shown in Table I.

TABLE I

| ZINC OXIDE SAMPLE | | | ZINC PEROXIDE CONTENT (%) | |
|---|---|---|---|---|
| Process | Average Particle Size (micron) | Apparent Density (g/cm$^2$) | Initial Product | Final Product |
| American | 0.90 | 1.12 | 47 | 21 |
| American | 0.27 | 0.51 | 57 | 26 |
| French | 0.45 | 0.28 | 72 | 32 |
| French | 0.11 | 0.28 | 73 | 33 |

The embodiments of the invention in which an exclusive property or privilege is claimed are defined as follows:

1. A process for the production of a mixture of butadiene-acrylonitrile polymer and zinc peroxide which comprises: (I) forming an aqueous mixture in a reactor equipped with means for agitation and means for temperature control, said aqueous mixture comprising (a) from about 15 to about 30 weight percent of zinc oxide made by the French Process being at least about 99 weight percent pure and having an average particle size of from about 0.1 to about 0.5 micron, (b) from about 0.0075 to about 0.2 parts by weight of sulphuric acid per part by weight of zinc oxide, (c) from about 1 to about 5 moles of hydrogen peroxide per mole of zinc oxide, and (d) the balance to 100 weight percent being water, said aqueous mixture being formed by adding said zinc oxide to a preformed mixture in said reactor of said sulphuric acid, said hydrogen peroxide and said water while maintaining the contents of said reactor in an agitated condition and at a temperature of from about 20° to about 35° C. throughout the addition of said zinc oxide and then for a further time of from about 1 to about 4 hours, thereby producing an aqueous slurry of a mixture of zinc peroxide and zinc oxide containing less than about 0.05 weight percent of residual hydrogen peroxide; and (II) transferring said aqueous slurry to a mixing vessel, adding thereto and mixing therewith a stream of an aqueous latex of a butadiene-acrylonitrile polymer, said polymer containing from about 20 to about 45 weight percent acrylonitrile and having a molecular weight characterized by a Mooney (ML 1+4 at 100° C.) of from about 35 to about 65, contacting the resulting mixture with an aqueous stream of calcium chloride to coagulate said mixture, separating said coagulated product from the aqueous phase, recovering and drying said product to a water content of less than about 1 weight percent to yield a final product containing from about 48 to about 57 weight percent of said polymer and from about 43 to about 52 weight percent of said mixture of zinc peroxide and zinc oxide wherein said final product contains at least about 27.5 weight percent zinc peroxide.

2. The process according to claim 1 wherein said zinc oxide is at least about 99.5 weight percent pure.

3. The process according to claim 2 wherein said zinc oxide is at least about 99.9 weight percent pure.

4. The process according to claims 1, 2 or 3 wherein said zinc oxide comprises from about 20 to about 25 weight percent of said aqueous mixture in said reactor.

5. The process according to claims 1, 2 or 3 wherein said contents of said reactor are maintained at a temperature of from about 25° to about 30°.

6. The process according to claims 1, 2 or 3 wherein said sulphuric acid comprises from about 0.008 to about 0.014 parts by weight of said aqueous mixture in said reactor per part by weight of zinc oxide and said hydrogen peroxide comprises from about 1 to about 2 moles of said aqueous mixture in said reactor per mole of zinc oxide.

7. The process according to claims 1, 2 or 3 wherein said polymer contains from about 30 to about 40 weight percent acrylonitrile and has a molecular weight characterized by a Mooney (ML 1+4 at 100° C.) of from about 40 to about 55.

8. The process according to claim 3 wherein said final product has a water content of less than about 0.5 weight percent and contains from about 50 to about 55 weight percent of said polymer and from about 45 to about 50 weight percent of said mixture of zinc peroxide and zinc oxide.

9. The process according to claim 8 wherein said final product contains from about 31 to about 33 weight percent of zinc peroxide.

* * * * *